Oct. 30, 1962 G. B. RICHARDS 3,060,957
VALVE
Filed June 16, 1959 3 Sheets-Sheet 1

INVENTOR.
George B. Richards
BY
Fidler, Beardsley & Bradley
Attys.

Oct. 30, 1962 G. B. RICHARDS 3,060,957
VALVE

Filed June 16, 1959 3 Sheets-Sheet 2

INVENTOR.
George B. Richards
BY
Fidler, Beardsley & Bradley
Att'ys.

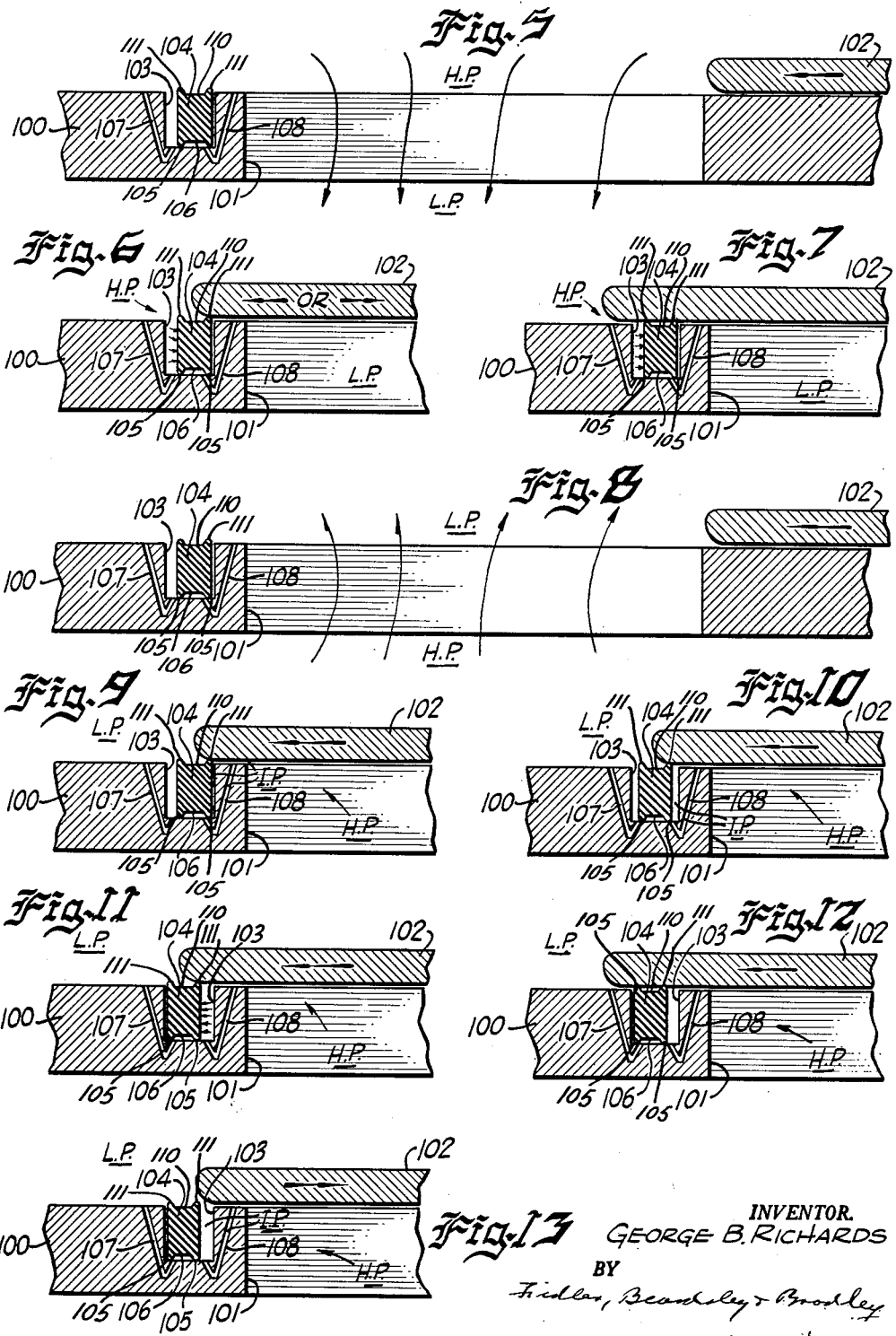

United States Patent Office 3,060,957
Patented Oct. 30, 1962

3,060,957
VALVE
George B. Richards, Deerfield, Ill., assignor to Liquid Controls Corporation, North Chicago, Ill., a corporation of Illinois
Filed June 16, 1959, Ser. No. 820,675
7 Claims. (Cl. 137—219)

The present invention relates generally to valves, and more particularly to valves for controlling the flow of fluids.

Valves used to control the flow of liquids through conduits are sometimes subjected to great differentials in pressures between the inlet and outlet ports thereof. In the past it has been customary to employ for all pressures valves constructed in a conventional and well known manner but modified as required to provide valve parts capable of withstanding the pressures to which they are intended to be subjected during the opening and closing of the valve and to provide a sufficient mechanical advantage in the operating mechanism to enable the valve to be operated. As it could be expected this has resulted in heavy, cumbersome and expensive valves which either have to be operated by power or, if manually operated, have to be provided with a mechanism for gearing down the movements of the operating means to such an extent that the time consumed in operating the valve is quite considerable. This is very objectionable where it is desired to close off fluid flow rapidly. It is contemplated by the present invention to provide a valve capable of controlling the flow of fluids through a wide range of pressures which does not have the objectionable features pointed out above with respect to valves heretofore used for such purposes.

Accordingly, one object of the present invention is to provide a novel valve wherein the fluid pressures in its operating parts are substantially balanced to permit ease of operation thereof between closed and open positions and vice versa, regardless of the pressure of the fluid controlled thereby.

Another object is to provide a novel valve so constructed as to permit the use of materials therein which heretofore have not been suitable for use in conventional valves.

Another object is to provide a valve which is simple in construction and which may be easily and inexpensively fabricated by standard tools.

A further object is to provide a novel valve which is simple to service and whose parts may easily be replaced should this become necessary.

A still further object is to provide a valve which is of small size and of light weight as compared with valves of similar ratings now in common use.

A still further object is to provide a novel valve which may be quickly operated from closed to open positions and vice versa.

A common fault of conventional valves now in use for controlling the flow of liquids is that the throttling and the closing off of the liquid flow is effected between the closing member and a sealing surface. This subjects the sealing surface to excessive wear due to the turbulence of liquid flow thereacross which usually makes it necessary to use special kinds of sealing materials and which necessitates frequent replacement thereof.

It is a further object of the present invention to provide a valve wherein the sealing surface is not subjected to the throttling turbulence of the liquid during the closing and opening operations of the valve.

A further object is to provide a valve which is constructed so as to be effective during the closing action thereof to close off substantially all the liquid flow prior to the engagement between the moving member and the sealing surface and which is effective during the opening action to release the fluid flow subsequent to the separation of the moving member from the sealing surface.

A still further object is to provide a valve wherein the fluid does not pass over the sealing surface when the valve is open.

A still further object is to provide a valve wherein the sealing surface is not subjected to cavitation erosion.

A still further object is to provide a valve which is substantially free from cavitation effects.

A still further object is to provide a valve that will present a very low resistance of "head" to fluid flow in either direction but which nevertheless will close off the flow of fluid quickly and with very slight force applied to the control element thereof.

Another object is to provide a valve having a novel seal between the valve members which is fully effective regardless of the direction of liquid flow through the valve.

Still another object is to provide a valve having a sealing ring between the valve members which is so constructed that it is effective and will not be blown out even at high fluid pressures and regardless of the direction of fluid pressure in the sealing ring.

These and other objects and advantages of the present invention will be apparent from the following description taken together with the attached drawings, wherein.

FIGS. 5 to 13 inclusive are fragmentary sectional, and somewhat diagrammatic, views of a modified form of seal well adapted for use in the structure of FIGS. 1 to 4, such views showing the valve, including the seal, in various positions of use.

Figure 1:
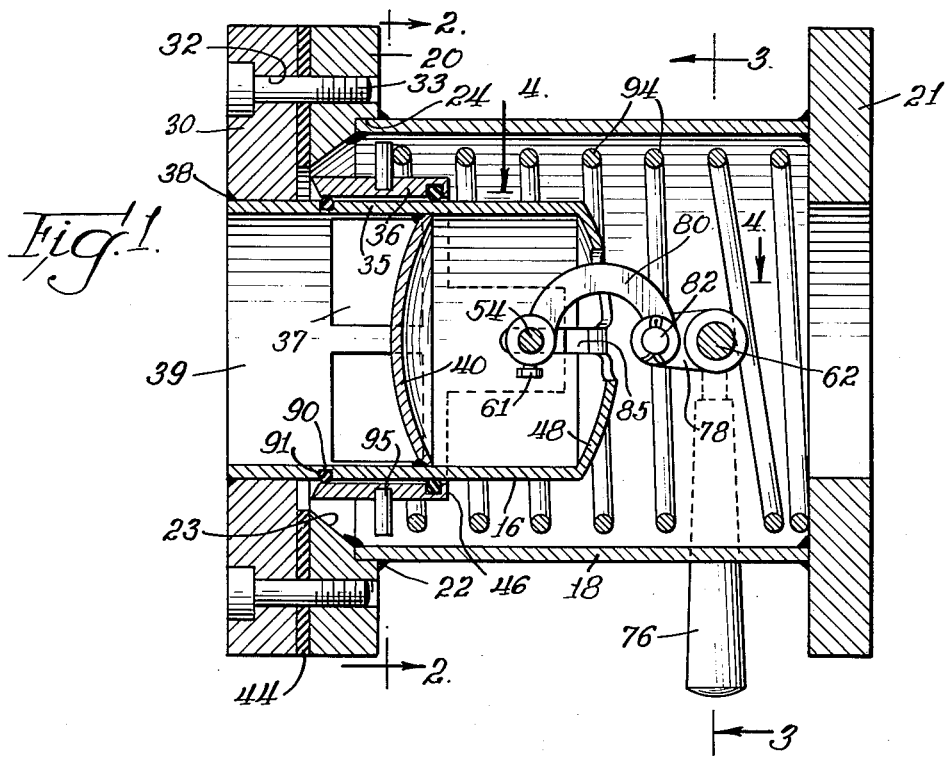
FIG. 1 is a longitudinal, sectional view of a valve embodying my invention the valve being shown in closed position.

The valve in accordance with my invention is shown in FIG. 1 as comprising a valve mechanism generally indicated at 16 detachably secured within a housing which may conveniently be made from a tubular, rigid section 18, of appropriate length secured between a pair of flanges 20 and 21. The tubular section 18 is dimensioned so as not to interfere with the flange bolts, and which preferably is circular and has an outer diameter smaller than the inner clearance circle of the flange bolts. The three parts of the housing are preferably welded or brazed together as at 22, depending on the material from which they are made so as to form a rigid assembly and a seal at the joint. The opening in the flange 20 is enlarged in order to permit the assembled valve mechanism 16 to be passed therethrough and the internal wall surface 23 of the flange is beveled outwardly as shown to a point where it meets a recess 24 provided in the inside face of flange 20 for receiving the tubular wall section 18 in order to make a stronger joint therewith.

Figure 2:
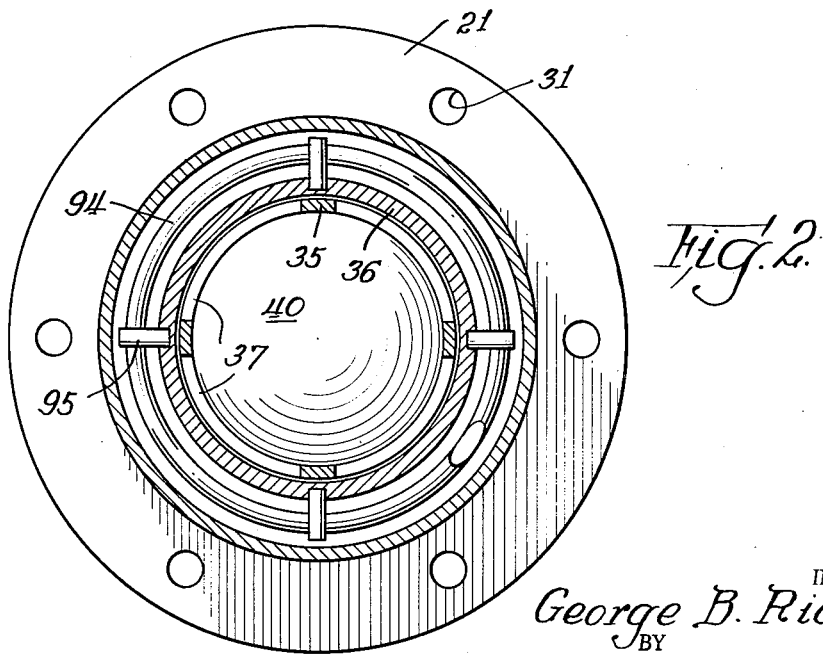
FIG. 2 is a cross sectional view taken along line 2—2 of FIG. 1.

The valve mechanism 16 is preferably mounted on a standard flange 30 which may conveniently be identical with flange 21 except that it is provided with a plurality of countersunk holes 32 between the bolt holes for receiving suitable fastening elements, such as Allenhead screws 33, threaded into registering threaded holes 34 in housing flange 20. Holes 32 and 34 should be spaced equidistantly between adjacent flange bolt holes 31 (FIG. 2). In this way the valve mechanism may be completely assembled as a unit prior to being installed in the housing.

The valve elements that control the fluid flow comprises a cylindrical, ported fixed partition element 35, and a sleeve member 36 sildably mounted on the fixed valve element 35 and movable between a position as shown in FIG. 1 wherein it closes fluid passages or ports 37 in the cylindrical wall thereof and open position (not shown) wherein it clears the ports 37 to permit unrestricted flow of fluid therethrough. The valve element 35 is preferably in the form of a circular cylinder having an external diameter such as to fit snugly within the opening in the flange 30. The edges of the opening in the flange 30 are beveled off as indicated by reference number 38 so as to permit the welding of the valve element 35 to the flange at these points without leaving weld material where it would interfere with the proper mounting of the flange. Both faces of flange 30 preferably are carefully faced off after the welding operation.

I have illustrated the ports 37 in the fixed value element 35 as constituting four arcuately rectangular openings in the cylindrical wall thereof, aligned in a direction longitudinally of the element and preferably equally spaced about the circumference thereof. The total area of the ports 37 is sufficiently large to pass the required flow of fluid and preferably is smaller than the area of the inlet opening 39 in valve element 35. The fixed valve element 35 is provided with an inwardly dished partition 40 which is provided for the purpose of guiding and thereby reducing the turbulence of the fluid flowing from the inlet 39 through the ports 37. The fixed valve element 35 also is provided with an external groove or channel 42, extending around the circumference thereof in alignment with the inner surface of the flange 20. This groove is provided for the purpose of receiving the inner edge of a gasket 44 disposed between the flanges 20 and 30. This gasket serves to provide the seal between flanges 20 and 30.

The movable valve element 36 is in the form of a cylindrical tubular sleeve, having a sliding fit with the cylindrical valve member 35. The sleeve 36 is dimensioned so as to cover completely the ports 37 when it is in closed position as shown in FIG. 1. The cylindrical surface of the fixed valve member 35 extends at least to and preferably beyond the right hand edge 46 of the movable valve element 36 when the latter is in the retracted position (not shown) wherein it will clear the valve ports 37. The fixed valve member 35 preferably is provided with an outwardly dished baffle 48 which may conveniently be formed integrally therewith.

In order to enable the valve member 36 to be connected to a valve actuating mechanism it is provided with a pair of ears 52 and 53 having journaled therein a shaft 54 (FIG. 4) extending through the ears and having a shoulder 55 and a cotter pin 56 on opposite sides thereof for the purpose of keeping it in place.

The valve actuating mechanism is shown in its extended or valve closing position in FIG. 1 and in its retracted position wherein it will open the valve in FIG. 1. An operating shaft 62 for the valve actuating mechanism extends through an opening 63 in the wall of the tubular housing portion 18 and is journaled therein in a manner better seen in FIG. 3. A bearing insert 64 having a machined opening 65 for journaling the shaft 62 is securely welded or brazed to the housing portion 18, preferably both internally and externally thereof. A bearing block 66 is welded to the inner surface of the cylindrical housing 18 diametrically opposite the bearing insert 64 and is provided with an opening 67 for receiving the end of the shaft 62. A sealing gland preferably is provided between bearing insert 64 and shaft 62 in order to prevent fluid from escaping therethrough and any convenient type of seal may be employed. In the drawings I have indicated a sealing gland consisting of an O-ring seal 68 disposed in a groove 69 in the shaft at a point located within the bearing insert 64. In order to retain the shaft in the housing a retaining pin 70 extending through an aperture provided therefor in the shaft 62 may be employed. A washer 72 is preferably interposed between the retaining pin 70 and the bearing insert 64.

The shaft 62 may be rocked in any convenient manner to actuate the valve. For the sake of illustration I have shown the shaft as being provided with an operating handle 76 which may be secured thereto in a suitable known manner.

A crank 78 is secured to the shaft 62 about in the center of the housing by means of, for example, a screw 79 and is coupled to a crank arm 80 secured to shaft 54 and movable therewith, by means of a crank pin 82 extending through registering openings therein. The crank pin may be kept in place in a known manner by means of a pair of cotter pins as shown. The crank arm 80 is made in an arcuate shape so as to clear the shaft 62 when the operating mechanism is in the retracted position shown in FIG. 3. The valve is closed by rotating the handle 76 through an arc of 180 degrees in a counter clockwise direction as viewed in FIG. 1 to cause the operating mechanism to assume the position shown in FIG. 1. It will be noted that when the movable valve element 36 is moved toward its closing position it will gradually decrease the open area of ports 37 to gradually throttle the fluid flow until the leading edge of the movable valve element moves past the left hand edge of the ports, at which time the fluid flow will be substantially cut off. Some fluid may still escape between the valve members depending on the sliding fit therebetween but this flow will be completely shut off when the movable valve element 36 engages the fixed seal hereinafter described. In order to prevent flow of fluid between the two valve elements when the valve is in closed position I provide an O-ring seal 91 disposed in an annular groove 90 in the internal wall of the stationary valve element 35, as indicated in FIG. 1. A similar O-ring sealing arrangement is carried by the movable valve element as shown in FIG. 1. In some applications it may be desirable to have this latter O-ring seal carried by the stationary valve member 35 instead of by the movable valve member 36 in which case a groove is provided therefor on the stationary member at a point somewhat to the right of the right-hand edges of ports 37 as viewed in FIG. 1 where a seal disposed therein will make contact with the movable member throughout the entire range of movement of the latter. It will be noted that in neither location of the O-ring seal will any sharp edges pass thereover to subject it to abrasion when the valve is operated whereby a long operating life for the seal is ensured.

In order to permit the shaft 54 journaled in the ears 52 and 53 of sleeve member 36 and crank arm 80 to move to the position shown in FIG. 1, I cut an opening 85 in the baffle 48 of such shape as to permit them to pass therethrough. The turbulence of the fluid flowing through the valve resulting from this opening in the baffle 48 is so small as to be of no consequence in most applications. This added turbulence may of course be avoided if desired by extending the ears 52 and 53 sufficiently to provide clearance between the lower end of the crank arm 80 and the upper surface of domed baffle 48, when the valve actuating mechanism is in extended position as shown in FIG. 1.

It will be noted that valve mechanism described is very nearly balanced, so that only a very small force is needed to close or open the valve, even when fluids are applied to the valve at very high pressures. It will be apparent to those skilled in the art, that with the seal 90 in position the pressures operating on the movable valve member 36 when the latter is in the closed position shown will be completely balanced, and that no matter how great the difference in pressure between the inlet and outlet of the valve is, no unbalanced forces tending to either open or close the valve will be applied to the valve member 36. It will thus be appreciated that the valve in accordance with my invention is capable of controlling flow of fluids at pressures limited only by the mechanical strength of the materials used and because of the absence of unbalanced forces, the valve may quickly and easily be moved between open and closed positions. It will also be appreciated that this will permit materials to be utilized in the valve parts and valve operating mechanism which could not be employed in conventional types of valves. The valve has only a few operating parts which are easily assembled and replaced.

Because of the slight operating pressure required to actuate the valve it is particularly well suited for application wherein it is desired to control fluid flow by means of a float instead of by manual actuation as shown.

It should be noted that although the valve has been described as having the stationary valve member 35 connected ot the inlet and the housing flange 21 connected to the outlet, it operates equally well with fluid flowing in the opposite direction. Thus the valve may be mounted in either direction and the reversing of the fluid pressures applied to the valve will have substantially no effect upon its operating characteristics.

Figure 3:
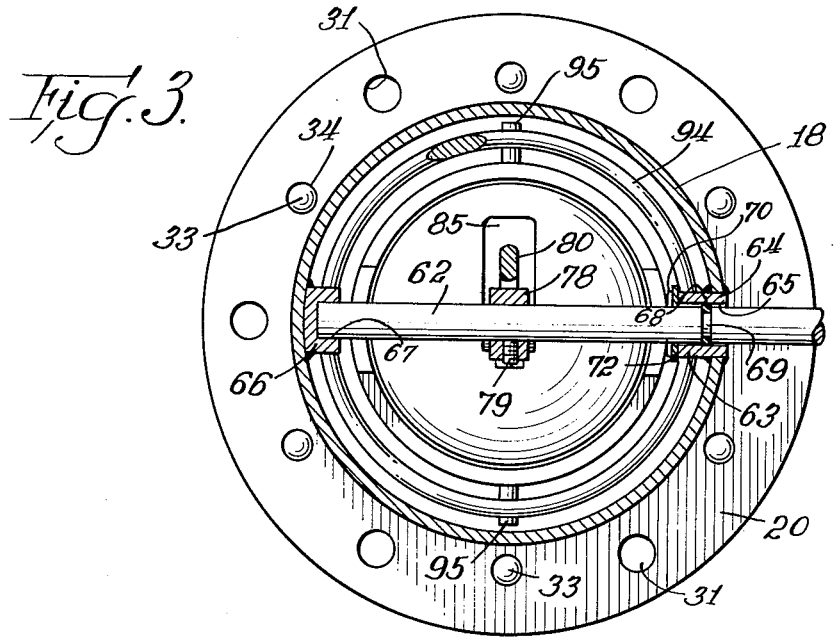
FIG. 3 is a reduced cross-sectional view taken along line 3—3 of FIG. 1.
Figure 4:
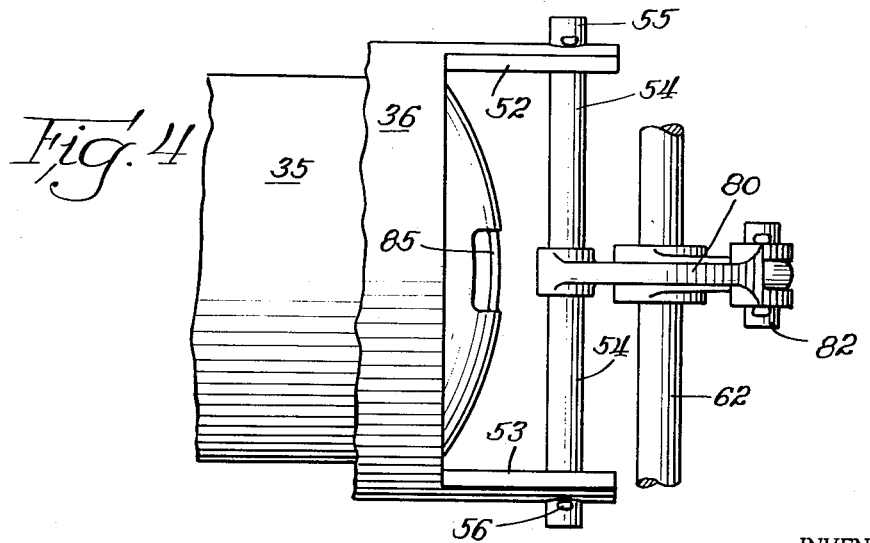
FIG. 4 is a fragmentary, sectional view taken along line 4—4 of FIG. 1.

In certain applications of the valve it may be desired to bias it either toward closed or open position. This may conveniently be accomplished by a compression spring seated in the required end of the housing and bearing against the movable valve element 36. FIGS. 1 to 3 illustrate a way in which the movable valve element 36 may be biased toward closing position. A compression spring 94 is seated in the housing against flange 21 and bears against the valve element 36 through lugs 95 secured to the outer surface thereof. Lugs 95 are shown in the form of short pins inserted in holes provided therefor in the valve element 36 but may of course take any desired form suitably secured to the external surface of the valve member.

In lieu of the conventional type of O ring seal (90—91) employed in forming the fixed seal in the embodiment of the invention shown in FIGS. 1 to 4 it is preferable to use a novel seal shown in FIGS. 5 to 13 and described hereinafter. The novel seal is so formed that the ring will not blow out of its seat, even at very high fluid pressures and regardless of the direction of flow of liquid through the valve.

It will be understood that the novel seal is suitable for application to structures other than the structure shown in FIGS. 1 to 4 but for purposes of illustration, it is shown and described in connection with its application to the latter.

Referring now particularly to FIGS. 5 to 13, a portion of the valve is shown, including an inner fixed valve member 100 which may be similar to the member 35 above described and formed with a port 101 (or ports), and an outer sleeve-like valve member 102 slidable on the fixed member between a position closing the port 101 (or ports) and a position exposing the port 101 (or ports).

Formed in the fixed valve member 100 is a ring shaped groove or seat 103 in which is seated a sealing ring 104 formed of suitable resilient sealing material such as synthetic rubber or other plastic. The sealing ring 104 has a peripherally continuous groove 106 in its inner wall or face with body portions or flanges 105 located on either side of the groove. The ring is so dimensioned that the flanges 107 bear snugly against the bottom of the groove 103 or ring seat and the ring is retained against longitudinal displacement except upon the application of liquid pressure thereon as hereinafter explained.

The outer wall or face of the ring 104 is formed with a groove 110 with body portions or flanges 111 on either side of the groove. The flanges 111 are positioned to bear against the valve member 102 when it is positioned as shown in FIGS. 7 and 12, and the flange 111 nearest the port 101 is positioned to bear alone against the valve member 102 when the latter is in the position shown in FIGS. 6, 9, 10 and 11.

Passages 107 and 108, which preferably are circular in cross-section, are provided in the fixed valve member and extend from the outer surface to the bottom wall of the ring seat 103. The inner ends of the passages 107 and 108 are so located that when the ring 104 is at the right hand end of ring seat 103 (as seen in FIG. 5) the passage 108 communicates with the groove 106 of the ring; when the ring is in a centered position in the ring seat 103 (as seen in FIG. 12) the groove is closed from both passages 107 and 108; and when the ring is at the left hand end of the groove 103 (as seen in FIG. 13) the passage 107 communicates with the groove 106.

The operation of the valve of FIGS. 1 to 4 with the form of ring seal shown in FIGS. 5 to 13 is similar to the operation above described except that, regardless of the liquid pressure or the direction of the liquid pressure, there is no substantial force on the ring in a direction tending to force it out of the seat.

Referring now to FIG. 5, the valve is shown in open position with the higher liquid pressure on the outside of the fixed valve member and with the ring 104 at the right hand end of the seat. High pressure fluid is in the seat and both passages. When the movable valve member is moved toward closed position to close the passage and bear against the ring (as seen in FIG. 6), low pressure exists in the passage 108 and the groove 106 and the ring is forced downwardly in the seat and against the right hand wall and there is no force tending to urge the ring out of the seat. A similar condition exists when the movable valve member is moved further toward closed position as seen in FIG. 7 and when it is in closed position.

The valve may be opened and closed repeatedly without changing the position of the ring in the seat so long as the direction of flow of the liquid is not changed. The pressure of the liquid is such as to urge the ring into its seat in all positions of the movable valve member.

If the direction of flow is changed from that just described so that the high pressure is inside the fixed valve member and the low pressure is outside, the pressures in the seat and passages will be somewhat changed but they will still be in such direction as to urge the ring into its seat.

Let it be assumed that the direction of flow is thus changed while the ring is at the right hand end of its seat. It will be seen from FIG. 8 that low pressure fluid is present in the seat and the passages. As the movable valve member is moved into position to close the port 101 and the passage 108, a pressure intermediate the high pressure and the low pressure is established temporarily in the passage 108 and in the seat between the ring and the right hand end of the seat (as indicated in FIG. 10).

The intermediate pressure is established by reason of this fact and the area of the annular clearance space between the movable valve member (adjacent the entrance to the passage 108) and the fixed valve member is less than the cross-sectional area of the passage 108. Thus there is a restriction in the flow of liquid from the clearance space into the passage and a temporarily lower pressure in the passage.

Low pressure exists in the seat on the left hand side of the ring and hence the ring tends to move to the left. The high pressure in the fixed valve member is transmitted through the clearance space between the valve members and is established in the passage 108 and the seat (as seen in FIG. 11), but by this time the movable valve member has been moved far enough to engage the ring and hold it in its seat against the pressure differential acting on the ring. Further movement of the movable valve member toward closed position (as seen in FIG. 12) serves to hold the ring more firmly in its seat. Upon reverse movement of the movable valve member, that is movement from closed toward open position, an intermediate pressure condition is set up in the passage 108 and in the groove 103 on the right hand side of the ring at the instant that the movable valve member moves off the ring. Low pressure is present in the passage 107 and in the recess 106 and hence the ring is held in the seat and there is no force in the ring tending to urge it out of the seat.

It will be seen from the foregoing that regardless of the direction of flow of the liquid and regardless of the direction of movement of the movable valve member, the liquid pressure on this ring is never in a direction tending to force the ring from its seat. Thus, not only is the danger of dislodgment of the ring avoided but the friction of the slidable member is reduced.

The sealing arrangement is especially advantageous when it is desired that the valve be used in a line wherein the direction of flow may be reversed. In this connection it will be seen that the invention provides three different sealing actions where reverse flow is involved. In the first place there is the main valving action between the two valve members for opening or closing the flow through the valve. Secondly, there is a valving action providing automatic register of the proper passage with the groove in the ring which causes the ring to be retained in its seat by selective pressure differential. Finally there is a reduction in the high pressure applied to the ring from the inside of the fixed valve member, which prevents the ring from being dislodged.

It will thus be appreciated that my valve as described herein is particularly effective when used to control the flow of high pressure fluids because the forces acting on the movable valve element are substantially balanced with the result that only a small actuating force is needed to operate my valve as compared to the operating forces needed to operate conventional types of valves. This makes it possible to utilize a simple and inexpensive mechanism for operating the valve. Due to the absence of torsional stresses on the valve elements, the various operating parts of the valve may be fabricated from materials which are unsuitable for use in conventional valves where the parts operate against the fluid pressures. Thus my invention makes it possible to produce a compact, small, simple, extremely rugged and very effective valve as compared with conventional valves of comparative capacities. The extreme simplicity of the valve makes it easy to service and install and the fact that no close tolerances have to be maintained makes it possible to fabricate it from readily available stock with little if any machining required. Inasmuch as the sealing surfaces are not exposed to turbulent fluid flow as is the case in conventional valves, the sealing surfaces will not be subjected to the wear by erosion and cavitation by the fluid as is the case in conventional valves.

Although my valve is particularly advantageous for controlling fluids at high pressures, whether they be liquids or gases, it will be appreciated that the valve will be highly effective in controlling fluids at low pressures as well. Another great advantage of my novel valve is that it will function satisfactorily in a wide range of temperatures limited only by the properties of the materials used in the seals.

This application is a continuation-in-part of my application Serial No. 390,874 filed November 9, 1953 and now abandoned.

I claim:

1. A cut-off valve for liquids comprising a relatively stationary assembly including a hollow casing having inlet and outlet openings and a tubular partition fixed in said casing and having a cylindrical portion with its outer end registering with one of said openings and forming a valve member, said cylindrical portion having a port therein, an annular, circumferential groove in a surface of said cylindrical portion forming a sealing ring seat, a sealing ring of less width than said seat and seated in said seat and having a circumferential groove in its inner face providing spaced flanges bearing on the bottom wall of said seat, said cylindrical portion having passages leading into said seat from said surface of said cylindrical portion on opposite sides of said seat and opening into the bottom wall of said seat at points spaced apart a distance greater than the width of the ring and positioned respectively to communicate with the groove in said ring when said ring is at the corresponding end of said seat, a cylindrical valve member telescoping over said cylindrical portion and slidable between a position wherein it is in engagement with said sealing ring and closing said port and a position exposing said port, the entire portion of said cylindrical member engageable with said sealing ring having a circumferentially continuous sealing surface, a second sealing ring enclosed between said cylindrical member and said cylindrical portion on the opposite side of said port from said first sealing ring, and means engageable with said cylindrical member for moving the latter between port-closing and port-exposing positions.

2. A cut-off valve as set forth in claim 1 wherein the cross-sectional area of the annular clearance space between said valve members at the entrance of the passage nearest the open position of said movable valve member is less than the cross-sectional area of said passage.

3. A cut-off valve for liquids comprising an assembly including a hollow casing having inlet and outlet openings and a partition fixed in said casing and having a cylindrical portion with its outer end registering with one of said openings and forming a first valve member, a cylindrical member slidable relatively to the cylindrical portion of said first valve member and forming a second valve member, one of said valve members having a port therein adapted to be opened or closed upon movement of the other valve member relatively to said one valve member, a first one of said valve members having therein a circumferential groove in a surface thereof on one side of said port forming a sealing ring seat opening toward the other valve member, a sealing ring of less width than said seat seated in said seat in position to sealingly engage said other valve member when the latter is moved to port closing position, the entire portion of said other valve member which is engageable with said sealing ring having a circumferentially continuous surface, said sealing ring being movable toward either end of said seat and formed with a circumferential groove in its inner face providing spaced flanges bearing on the bottom wall of said seat, said one valve member having passages leading into said seat from said surface and on opposite sides of said seat and opening in the bottom wall of said seat at points spaced apart a distance greater than the width of the ring and positioned respectively to communicate with the groove in said ring when said ring is at the corresponding end of said seat, and means for effecting relative opening and closing movement of said valve members.

4. A cut-off valve as set forth in claim 3 wherein the cross-sectional area of the passage which is nearest to said second valve member when said valve members are in open position is greater than the area of the annular clearance space between said valve members immediately adjacent said last-named passage.

5. A cut-off valve for liquids comprising an assembly including a first cylindrical valve member and a second cylindrical valve member slidable relatively to said first valve member, at least one of said members having a port therein adapted to be opened or closed upon movement of the other valve member relatively to said one valve member, a first one of said valve members having therein a circumferential groove in a surface thereof on one side of said port forming a sealing ring seat opening toward the other valve member, a sealing ring of less width than said seat seated in said seat in position to sealingly engage said other valve member when the latter is in port-closing position, the entire portion of said other valve member which is engageable with said sealing ring having a circumferentially continuous surface, said sealing ring being movable toward either end of said seat and formed with a circumferential groove in its inner face providing spaced flanges bearing on the bottom wall of said seat, said one valve member having passages leading into said seat from said surface and on opposite sides of said seat and opening in the bottom wall of said seat at points spaced apart a distance greater than the width of the groove in said ring and positioned respectively to communicate with the groove in said ring when said ring is at the corresponding end of said seat, and means for effecting relative movement between said valve members for opening and closing said valve.

6. A cut-off valve as set forth in claim 5 wherein said sealing ring is formed with an annular groove in its outer face providing spaced flanges for engagement with said other valve member when the latter is in port-closing position.

7. A cut-off valve as set forth in claim 5 wherein the end walls of said sealing ring seat and the end walls of said sealing ring are substantially planar and lie in substantially parallel planes substantially perpendicular to the axis of relative movement of said valve members.

References Cited in the file of this patent

UNITED STATES PATENTS

| | | |
|---|---|---|
| 1,520,117 | Buehle | Dec. 23, 1924 |
| 2,378,985 | Davis | June 26, 1945 |
| 2,505,410 | Klaas | Apr. 25, 1950 |
| 2,688,975 | Born | Sept. 14, 1954 |
| 2,704,650 | Rand | Mar. 22, 1955 |
| 2,781,997 | Berck | Feb. 19, 1957 |
| 2,841,429 | McCuistion | July 1, 1958 |
| 2,852,035 | Holle | Sept. 16, 1958 |

FOREIGN PATENTS

| | | |
|---|---|---|
| 528,208 | Canada | July 24, 1956 |
| 1,186,275 | France | Feb. 23, 1959 |